(12) United States Patent
Misra et al.

(10) Patent No.: US 10,216,485 B2
(45) Date of Patent: *Feb. 26, 2019

(54) COMPUTER PLATFORM FOR DEVELOPMENT AND DEPLOYMENT OF SENSOR DATA BASED APPLICATIONS AND SERVICES

(71) Applicant: Tata Consultancy Services Limited, Maharashtra (IN)

(72) Inventors: Prateep Misra, West Bengal (IN); Arpan Pal, West Bengal (IN); Balamuralidhar Purushothaman, Bangalore (IN); Chirabrata Bhaumik, West Bengal (IN); Deepak Swamy, Austin, TX (US); Venkatramanan Siva Subrahmanian, College Park, MD (US); Debnarayan Kar, West Bengal (IN); Soumitra Naskar, West Bengal (IN); Sumanta Ghosh, West Bengal (IN); Suman Adak, West Bengal (IN)

(73) Assignee: TATA CONSULTANCY SERVICES LIMITED (IN)

( * ) Notice: Subject to any disclaimer, the term of this patent is extended or adjusted under 35 U.S.C. 154(b) by 195 days.

This patent is subject to a terminal disclaimer.

(21) Appl. No.: 14/345,530

(22) PCT Filed: Sep. 18, 2012

(86) PCT No.: PCT/IN2012/000623
§ 371 (c)(1),
(2) Date: Mar. 18, 2014

(87) PCT Pub. No.: WO2013/072925
PCT Pub. Date: May 23, 2013

(65) Prior Publication Data
US 2014/0359552 A1    Dec. 4, 2014

(30) Foreign Application Priority Data

Sep. 19, 2011   (IN) .................... 2651/MUM/2011

(51) Int. Cl.
*G06F 8/36* (2018.01)
*G06F 8/60* (2018.01)
(Continued)

(52) U.S. Cl.
CPC ............... *G06F 8/00* (2013.01); *G06F 8/36* (2013.01); *G06F 8/60* (2013.01); *G06F 11/3668* (2013.01);
(Continued)

(58) Field of Classification Search
CPC ..... G06F 8/00; G06F 8/36; G06F 8/60; G06F 11/3668; H04L 41/04; H04L 41/5096;
(Continued)

(56) References Cited

U.S. PATENT DOCUMENTS 7,761,885 B2   8/2010   Labrou et al.
8,270,310 B2   9/2012   Raleigh et al.
(Continued)

*Primary Examiner* — Li B. Zhen
*Assistant Examiner* — Sen Thong Chen
(74) *Attorney, Agent, or Firm* — Hayes Soloway P.C.

(57) ABSTRACT

A method and system for real-time analytics of sensor-based data is disclosed. Also disclosed is a Cloud-based Paltform-as-a-Service (PaaS) offering for sensor driven applications with services and features for their complete life-cycle management including prompt development, testing, deployment and so forth. The method of the present disclosure enables real-time tracking of various physical parameters and attributes related to smart-spaces using sensor devices implemented in the premises of the smart-space environment and using crowd-sourced user input data. Further, the parameters obtained are sent to the cloud-computing server, wherein the analytics are performed in real-time based on the obtained parameters.

22 Claims, 5 Drawing Sheets

(51) Int. Cl.
*G06F 8/00* (2018.01)
*H04L 12/24* (2006.01)
*H04L 29/08* (2006.01)
*H04L 12/26* (2006.01)
*G06F 11/36* (2006.01)

(52) U.S. Cl.
CPC .............. *H04L 41/00* (2013.01); *H04L 41/04* (2013.01); *H04L 41/5096* (2013.01); *H04L 43/00* (2013.01); *H04L 67/10* (2013.01); *H04L 67/12* (2013.01)

(58) Field of Classification Search
CPC ......... H04L 67/12; H04L 67/10; H04L 41/00; H04L 43/00
USPC .......................................................... 717/100

See application file for complete search history.

(56) References Cited

U.S. PATENT DOCUMENTS

| | | | |
|---|---|---|---|
| 2002/0128751 A1* | 9/2002 | Engstrom | B60W 30/18181 701/1 |
| 2003/0208527 A1 | 11/2003 | Lglesais et al. | |
| 2007/0027583 A1* | 2/2007 | Tamir | G06Q 30/0283 701/1 |
| 2008/0005287 A1* | 1/2008 | Harvey | G06F 8/20 709/220 |
| 2008/0086564 A1* | 4/2008 | Putman | H04L 29/06 709/227 |
| 2008/0134156 A1 | 6/2008 | Osminer et al. | |
| 2009/0037570 A1* | 2/2009 | Yu | G01D 21/00 709/224 |
| 2011/0035187 A1* | 2/2011 | Dejori | G01D 9/005 702/187 |
| 2011/0105859 A1* | 5/2011 | Popovic | A61B 5/02405 600/301 |
| 2011/0161912 A1* | 6/2011 | Eteminan | G06F 8/20 717/101 |
| 2012/0211600 A1* | 8/2012 | Mellor | B64C 25/00 244/100 R |

* cited by examiner

COMPUTER PLATFORM FOR DEVELOPMENT AND DEPLOYMENT OF SENSOR DATA BASED APPLICATIONS AND SERVICES

CROSS-REFERENCE TO RELATED APPLICATIONS AND PRIORITY

The present application claims the benefit of Indian patent Application No. 2651/MUM/2011, filed Sep. 19, 2011, the entire disclosure of which is incorporated herein by reference.

TECHNICAL FIELD

The present disclosure described herein, in general, relates the field of smart ubiquitous computing systems, cyber-physical systems and the Internet-of-Things (IoT). More particularly, the disclosure relates to a method and system for enabling a unified platform capable of providing suite of services for development and deployment of sensor-based applications in the smart ubiquitous computing environment.

BACKGROUND

Smart ubiquitous computing systems have been developed and deployed in order to observe, monitor and track the state of various physical infrastructures, state physical objects, environment, human beings and their activities and utilize these observations to provide applications and services that enrich the lives of people and help them in their day-to-day activities. The environments in which such smart ubiquitous systems are deployed are referred to as "smart spaces".

In general, smart spaces includes various categories of sensors adapted for sensing and observation of various parameters in the environment that may enable to perform analytics on them to alert the end-users about the consequence of changes in the state, if any. For example, sensors may be deployed to observe and track location of any physical object, observe weather conditions to monitor natural calamities, observe traffics on the road to enable traffic shaping and vehicle surveillance systems etc.

Observations as described above are made by sensors and increasingly more and more sensors will be embedded in physical objects and things in the smart spaces. These sensors have transducers that transform a real life event or phenomenon into an electrical signal or digital data. In addition the sensors have computation and networking capabilities. Increasingly many of these sensors will directly or indirectly be connected to the Internet. Many of the sensors will be deployed by organizations, companies or public sector entities such as city governments or utilities or government departments. Also, many of the sensors will actually be owned and operated by private individuals. In case of private individuals, sensors embedded in mobile phones used by individuals will be an important class of sensors.

A critical requirement for development of smart ubiquitous computing environments leading to development of "smart spaces" is the ability to collect data from a large set of diverse sensors, aggregate and store the sensor data, perform specialized analytics on the data and combine and correlate observations from multiple diverse and geographically dispersed sensors. There is a need for scalable computing platforms that are able to provide these capabilities to software developers, including third party software developers, who can use the sensor data and the derived analytics to create new novel applications. Also, such platforms may be made available as web services accessed over the Internet, In such cases, these platforms can be categorized under the class of cloud computing services referred to as Platform-as-a-Service (PaaS).

In the background art, several systems have been implemented that perform the task of analysis of data captured by different category of sensors or telecommunication devices having sensing capabilities which are deployed in any smart space environment. These systems incorporate sensor devices that sense the state of various physical entities in any smart-spaces environments that could be processed and analyzed further to monitor, administer and control the services catered through these smart-spaces remotely. Though, there has been efforts made in the past for real-time data capture and analysis thereof meant for remote smart-space monitoring, the need for a unified platform that integrates the suite of services capable of provisioning the development of real-time applications and management thereof from sensor data captured through any sensor device still exists in the art.

As of today, there are various PaaS available including Google App Engine, Heroku, and Microsoft Azure etc. However, these are limited to general purpose application development and therefore do not provide specific support for development, deployment and management of sensor-based applications. These platforms do not provide specialized services required in IOT/Cyber Physical Systems domain. In this domain, there is a need for specialized services to cater to applications that leverages web connected sensors and sensors available as part of smart mobile devices. Sensor discovery, description, interfacing, query and tasking are some of the key requirements. Additionally, the sensor driven applications need to be event driven and therefore require capabilities such as event processing or stream processing. Further, these domains may require support for various types of databases such as RDBMS, NOSQL and Object Stores, etc., for scalable storage of different types of sensor observations. Also, the diversified domains may require specialized analytics and data visualization for deriving inferences and value addition. None of the above disclosed PaaS platforms provide support for all these features in a single platform.

On the other hand, there are some sensor platforms available as cloud computing services such as Pachube (Cosm), Sun Microsystem Sensor Networks etc. However these platforms mainly focus on sensor data publishing, subscription and storage services with very elementary support for application development. Additionally, there is very little support in these platforms for location based processing, spatial and spatio-temporal processing. Additionally, these sensor platforms provide no support for crowd sourced applications to be developed and deployed on these platforms.

Further, there are some sensors and gateway device vendors in the market including companies such as Digi, Mobile Devices etc. who provide a cloud based web services for remote device monitoring, management and data acquisition. However, these services cater for sensors and devices from a particular vendor only and are therefore not suitable for multi-vendor generic sensor device management, data capture and observation processing. Additionally, these services have very limited support for sensor data storage and analytics and almost no support for application development and deployment.

Additionally, a behavior based machine-to-machine (M2M) platform is known in the art that facilitates communication with global sensor network to enable sensor device management and generate composite applications without direct programming. Another implementation facilitating sensor-device management in the art uses cross APIs for accessing the sensor data across different platforms in a real-time. Further, an activity management system particular to specific domain such as semiconductor manufacturing is known in the art that comprises the steps of data collection, data storage and activation of services enables for improving the operational efficiency of the semiconductor manufacturing plant. An architecture facilitating automatic generation of software code for development of sensor driven applications is disclosed in the art.

Further, a framework facilitating context-aware advertising is known in the art, wherein the framework delivers relevant contents/ads to the end-consumer in context with the consumers behavior/habits tracked through sensors deployed in a smart-space environment. Further, an application scope management platform is known that works on the aspects of crowd sensing adapted for web-application deployment and management thereof. An enterprise resource management analytics platform enables data integration from remote resources to facilitate remote surveillance, monitoring and real-time events of agencies, organizations and communities to ensure safety and security in their campuses. Further, a system implementing graph pattern query to simplify writing Stream Processing application by application developer is known. Further, systems facilitating efficient resource management in general for processing tasks in virtualized environment are known that utilizes sharing of resources for effective task management.

However, none of the existing systems, methods, platforms or frameworks provide a unified system that facilitates sensor driven distributed application development, testing, deployment, application life cycle management, analytics service, data storage service, sensor services and modeling and simulation for analytics. Also, existing systems lack comprehensive hosting of services such as sensor service, analytics service, identity & access control service, data storage service that are required for prompt and speed-up sensor application development. Further, none of the platforms disclosed in the art facilitates real-time development and deployment of sensor-based applications using a rich suite of services that enables sensor data reusability, data normalizing and data privacy. As most of the platforms lack generic capabilities of sensor data processing, this further leads to increase in costs and effort required for development and deployment of sensor based applications. Further, since the platforms are designed with specific to particular devices thereby bounded with security and privacy policies, there is a little scope of further application developments using third-party resources.

In the background art, there have been efforts made in the past for providing vehicle telemetry applications that enables intelligent transportation services to end-user subscribers. In general, these applications are either provided vertically by the vehicle manufacturers/OEMs etc. or made available to the driver's Smartphone. In both cases, the applications development is enabled by using sensor data from various vehicle on-board/off-board sensors such as GPS, accelerometer and the like. Further, there have been efforts made in the art for implementing cloud computing technologies in the vehicle for providing vehicle telemetry applications. Further, there are vehicle to vehicle ad-hoc networks (VANETs) available in the art facilitating the provision of vehicle telemetry applications in a specific transport domain. However, the need for a single unified platform facilitating an intelligent transportation system by way of providing intelligent transport services in the platform for develop, test and deploy various telemetry applications using these services still exists in the art.

Thus, in view of the above, there is a long-felt need in the industry to address the aforementioned deficiencies and inadequacies.

SUMMARY OF THE DISCLOSURE

Before the present methods, systems, and hardware enablement are described, it is to be understood that this disclosure is not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

Embodiments of the present disclosure provide a system for providing an infrastructure platform in a smart-space environment that facilitates quick and easy development, and deployment and management of sensor driven applications. Briefly described, in architecture, one embodiment of the system, among others, can be implemented as follows. A suite of infrastructure services is integrated to the infrastructure platform and configured to acquire, store and analyze sensor data received from a plurality of sensor devices. A plurality of application program interfaces (APIs), a plurality of programming language specific libraries and a plurality of software development kits (SDKs) are provided to at least one application developer to utilize said suite of infrastructure services to develop, test, deploy and manage a plurality of sensor-based applications. A presentation module comprising a plurality of web-based portals is adapted to monitor, manage and control said suite of infrastructure services, the sensor-based applications and software and hardware infrastructure. A suite of infrastructure applications is configured to transmit and receive sensor data to and from the infrastructure platform.

The present disclosure can also be viewed as providing methods for providing infrastructure platforms in a smart-space environment characterized in facilitating quick and easy development, and deployment and management of sensor driven applications. In this regard, one embodiment of such a method, among others, can be broadly summarized by the following steps: configuring an infrastructure platform for execution of computational activities for facilitating dynamic development, deployment and administration of a plurality of sensor driven application; integrating a plurality of software components, a plurality of libraries, a plurality of infrastructure services, and a plurality of software developments tools to said infrastructure platform to pre-process and store data captured from a plurality of sensors and to disseminate analyzed data to a plurality of subscribers; providing a plurality of application program interfaces (APIs) and software development kits (SDKs) for a plurality of application developers to develop, test, deploy and manage at least one sensor driven application in said infrastructure platform; configuring a service orchestration to each of the plurality of subscribers and at least a portion of the plurality of application developers with said infrastructure platform using a user specific access and permissions, and implementing orchestration logic using a standard web service orchestration engine; and configuring the infrastructure platform to monitor, manage and control a utilization of service infrastructure, hardware and software infrastructure, and sensor applications by a plurality of different categories of a plurality of users.

In one embodiment, the present disclosure enables a Real-Time Integrated Platform for Services & Analytics (RIPSAC) which is a PaaS cloud computing platform that allows quick and easy development, deployment and administration of sensor driven applications. In this embodiment, the RIPSAC interfaces with a heterogeneous set of sensors and devices within a smart computing environment collecting sensor observations, storing the data in a database connected with the platform, performing scalable analytics on the data for the benefit of both the end subscribers as well as authorized third parties such as insurance companies and government regulators either within the vicinity of the smart computing environment on in a cloud, exporting de-personalized samples of that data to third party application developers to enable open software development. In this embodiment, the platform provide a suite of infrastructure services in the form of APIs and SDKs. RIPSAC provides a highly scalable platform for sensor integration, sensor data storage, analytics, rich query capabilities and visualization. The platform comprises a set of services related to sensor description, discovery, integration, sensor observation and measurement capture, storage and query in the form of APIs and libraries. In this embodiment, application developers including third-party software developers are adapted to develop, test, deploy and manage applications in the said cloud-computing platform. In this embodiment, end-users are adapted to download apps, subscribe & unsubscribe to them, control their privacy settings, and view usage history and billing information.

The principal object of the disclosure is to provide a Real-Time Integrated Platform for Services & Analytics (RIPSAC) in the form of a PaaS cloud computing platform that allows quick and easy development, deployment and administration of sensor driven applications.

Yet another object of the disclosure is to provide a method and system for a real-time platform enabling data capture from any ubiquitous device having at least one attached sensor, the said device being connected through a communication network to the Internet.

Yet another object of the disclosure is to enable a method and system for storing said data with assorted formats captured from various sensor devices in a database connected to the platform.

Yet another object of the disclosure is to perform a scalable analytics on the stored data in the database to derive insights, inferences and visualized data therefrom thereby allowing stakeholders to take further decisions on the businesses associated with that data.

Yet another object of the disclosure is to provide a method and system enabling real-time development, testing and deployment of sensor-based applications thereby facilitating crowd sourcing application developments.

Yet another object of the disclosure is to provide a method and system enabling to develop various sensor-based applications using the suite of services of the platform by selecting appropriate algorithms, software development kits (SDKs), application program interfaces (APIs) etc. bundled in said suite of services.

Yet another object of the disclosure is to enable a method and system for data analysis by capturing data from user inputs using crowd sourcing, and treating these data as data from software sensors.

Yet another object of the disclosure is to provide a method and system enabling dissemination of deployed applications on end-user computing devices subscribed to these applications and services thereof.

Still another object of the disclosure is enabling a method and system for appropriate privacy controls and end-user license agreements while performing the analytics on the data.

Still another object of the disclosure is enabling a method and system for providing the RIPSAC platform and services thereof for real-time analysis and monitoring of activities in diverse sectors including energy, utility, government, transportation, healthcare, and education etc.

BRIEF DESCRIPTION OF THE DRAWINGS

The foregoing summary, as well as the following detailed description of preferred embodiments, is better understood when read in conjunction with the appended drawings. For the purpose of illustrating the disclosure, there is shown in the drawings exemplary constructions of the disclosure; however, the disclosure is not limited to the specific methods and architecture disclosed in the drawings.

DETAILED DESCRIPTION

The description has been presented with reference to an exemplary embodiment of the disclosure. Persons skilled in the art and technology to which this disclosure pertains will appreciate that alterations and changes in the described method and system of operation can be practiced without meaningfully departing from the principle, spirit and scope of this disclosure.

Figure 1:
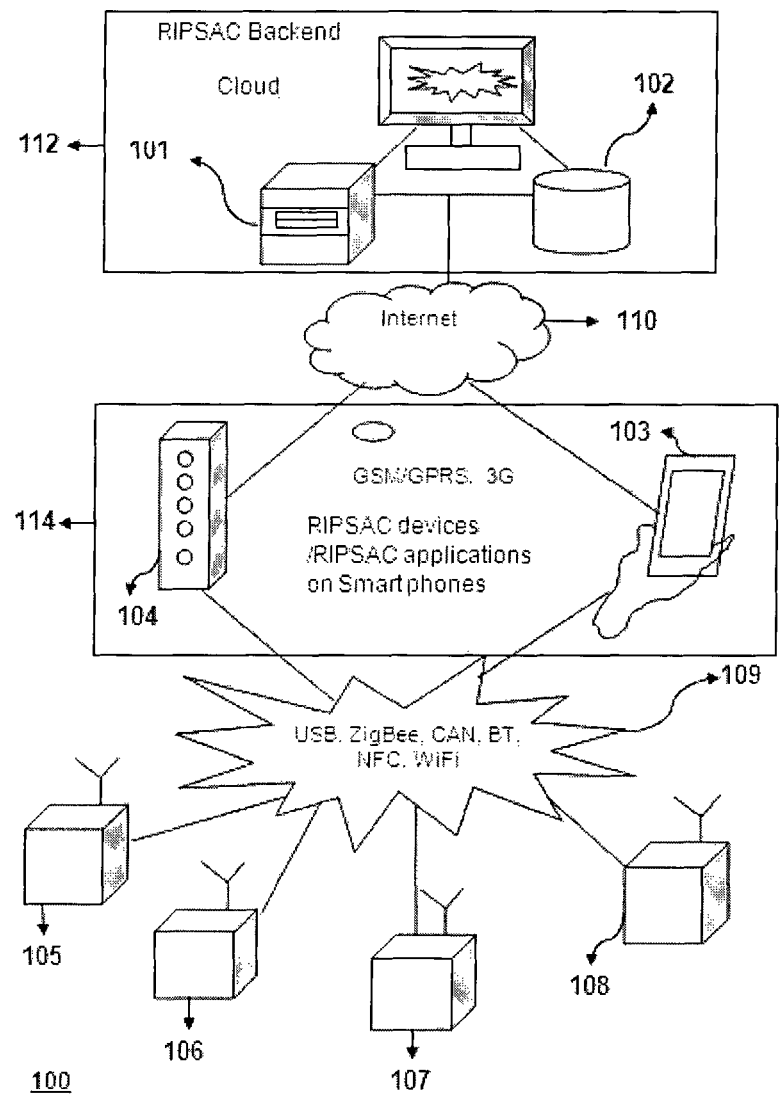
FIG. 1 schematically illustrates a system architecture diagram (100) displaying various hardware elements configured to perform real-time sensor data analytics in a smart computing environment according to an exemplary embodiment of the disclosure.

Referring to FIG. 1 is a system architecture diagram of a Real-Time Integrated Platform for Services and Analytics (RIPSAC) 100 comprising various hardware elements configured to perform real-time data analytics in a smart computing environment according to an exemplary embodiment of the disclosure.

As illustrated in FIG. 1, the system architecture (100) comprises a RIPSAC backend cloud (112) that includes a cloud server (101) connected to a database (102). The system further comprises various RIPSAC devices (114) implemented on different smart devices such as Smart phone (103), a telematics device (104) enabling real-time analytics of sensor data. The system further comprises various heterogeneous sensor devices (105), (106), (107) and (108) etc. placed in the vicinity of smart computing environment connected with various telecommunication devices such as Smartphone (103), and the telematics device (104) etc. Thus, the sensors along with the telecommunication devices collectively form an intelligent smart environment according to this exemplary embodiment.

Further, as illustrated in FIG. 1, the system platform (100) supports various connectivity options such as BLUETOOTH®, USB, ZigBee and other cellular services collectively illustrated as smart computing network (109). In an exemplary embodiment, the system platform interfaces with sensors (105, 106, 107, and 108) such as GPS, accelerometers, magnetic compass, audio sensors, camera sensors etc. deployed in vicinity of the smart computing environment. The platform enables connection of telecommunication devices such as Smartphone with the server, and accordingly with the database using any communication link including Internet, WAN, MAN referred to as (110) in FIG. 1. In an exemplary embodiment, the system platform (100) is implemented to work as a stand-alone device. In another embodiment, the system platform (100) may be implemented to work as a loosely coupled device to the smart computing environment.

In one embodiment, the Smartphone as illustrated in FIG. 1 may include built-in sensors such as accelerometer, compass, GPS, NFC reader, microphone and camera etc. In this embodiment, the system platform (100) may be installed on the Smartphone in the form of a mobile application ("App"). In such scenario, the inbuilt sensors in the Smartphone feed the data collected by them related to vehicle tracking, traffic measurements, and human driving characteristics etc. to the RIPSAC platform (100) acting as mobile app on the Smartphone. In such scenario, the Smartphone is considered to be a ubiquitous telematics platform which may act as a car phone if the Smartphone is located inside the car. Further, based on the data collected from various sensors, the system platform (100) with the help of various hardware and software platforms collectively performs the task of scalable data analytics on the captured sensor data in any smart computing environment.

Figure 2:
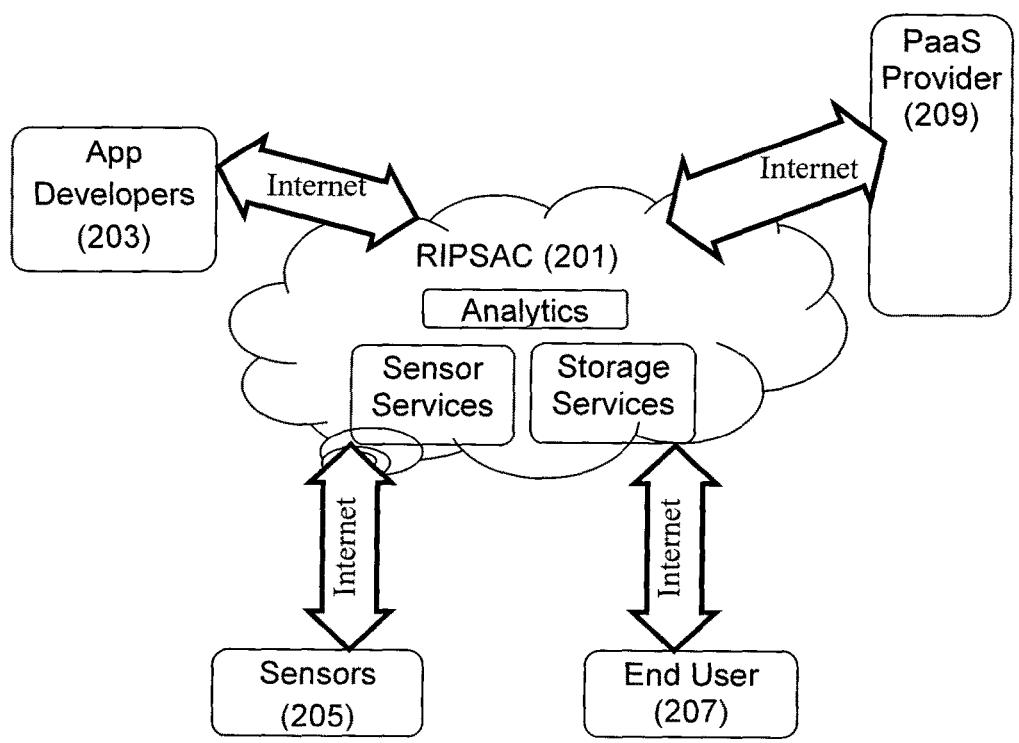
FIG. 2 is a block diagram (200) of RIPSAC platform illustrating various application developers/tenants, sensor data providers and subscribers being connected with said RIPSAC platform for accessing RIPSAC services and applications in accordance to an exemplary embodiment of the disclosure.

Referring to FIG. 2 is a block diagram (200) illustration various user-devices connected to RIPSAC platform for utilizing various RIPSAC services and applications in accordance with an exemplary embodiment of the disclosure. As illustrated in FIG. 2, the RIPSAC platform (201) provides various RIPSAC services related to sensors, storage and analytics to different stakeholders connecting with the platform. A plurality of sensor providing devices (205) act as contributors or publishers that publishes sensor data observed in any smart space environment. The sensor providing devices (205) own the sensor observation data.

A plurality of application developer devices (203) as shown in FIG. 2 communicates with the platform (201) by means of communication network, preferably by means of an internet connection. The application developers are adapted to access the RIPSAC services on the platform to develop varied sensor-driven application and deploy these on the platform (201) in the form of RIPSAC applications. As illustrated, a plurality of end-user subscriber devices (207) are shown that connects with the platform (201) by internet communication means in order to subscribe with the RIPSAC applications deployed in the RIPSAC platform (201). In an embodiment, the sensor providing devices (205) and the application developer devices (203) can perform the tasks interchangeably. In this exemplary embodiment, platform/PaaS provider (209) is an entity that runs the RIPSAC platform (201) as a hosted service.

In this exemplary embodiment, the RIPSAC platform (201) provides different services for each of the application developer/tenant device (203), sensor provider device (205), end-user device (207) and a platform provider (209) connected to the platform through internet means. In this exemplary embodiment, the platform provider (209) is provided with the ability to deploy and run the core RIPSAC services such as sensor, Storage and Analytics Services, deploy and run Identity, Security, Privacy and end User License Mgmt services. The platform provider is provided with the ability to deliver targeted advertisements, create a multi-tenant environment with control resource sharing, create separate environments of sandboxes for different tenants and enable operation support systems such as managing, monitoring, billing etc. In this exemplary embodiment, the sensor providing devices (205) are provided with the services needed to describe feature of interest and different types of phenomenon, sensor & sensor observation description.

Feeds & sensor streams definition, services required to publish & share sensor streams to the platform and services needed to define access control and privacy preferences for published sensor streams.

In this exemplary embodiment, the application developer/tenant devices (203) are provided with environments required for development & testing of applications in the form of Sandboxes. Further, Software Development Kits and Application Programming Interfaces (APIs) in form of web services calls or language specific libraries are made available to these devices. Additionally, the platform provides test sensor data to tenants so that they can develop and test applications. The application developer/tenant devices (203) are adapted to register and deploy Apps to the RIPSAC platform (201). The application developer/tenant devices are enabled to define end user license Agreements for their applications and can Start, Stop, upgrade, redeploy and undeploy applications. In this exemplary embodiment, the end-user devices (205) as shown in FIG. 2 are adapted to download apps, subscribe or unsubscribe to RIPSAC applications and services. Further, these devices are adapted to control the privacy setting of sensor data which they are contributing/publishing with the platform and are enabled to track & view usage history, billing information etc.

Figure 3:
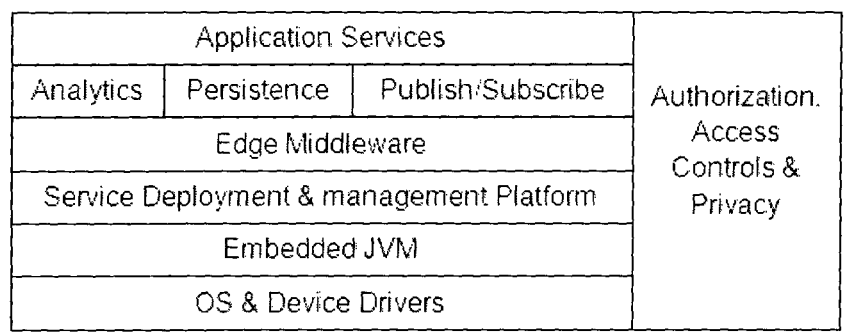
FIG. 3 is a block diagram illustrating various software layers of the in-car telematics device enabling real-time analytics of telematics data in accordance with an exemplary embodiment of the disclosure.
Figure 4:
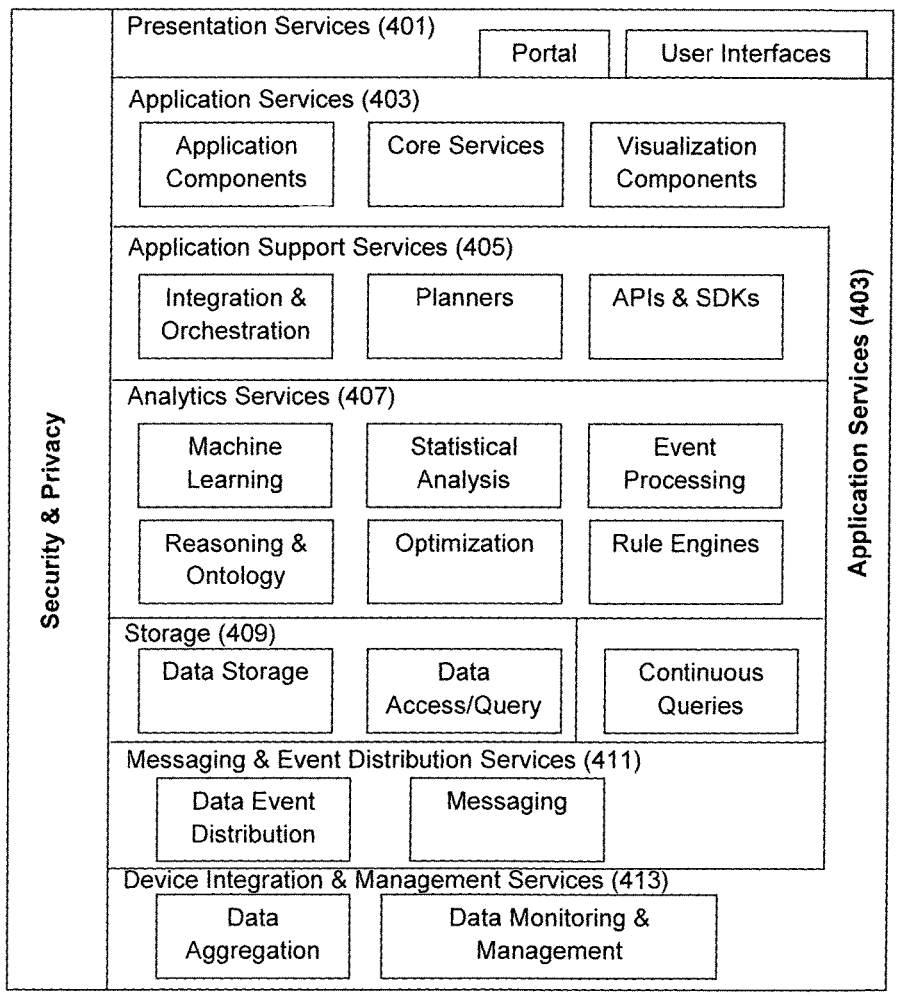
FIG. 4 is a block diagram illustrating the back-end software platform according to an exemplary embodiment of the disclosure.

In an embodiment, the services provided to various stakeholders in the platform including platform providers (209), application developers/tenants, sensor providers and end-user subscribers etc. are facilitated through various hardware/software components in the platform. FIGS. 3 and 4 refers to software architecture diagrams illustrating different suite of sensor-based services enabling real-time analytics of sensor data in accordance to an exemplary embodiment of the disclosure. The software architecture comprises three software platforms enabling the real-time including a sensing device software platform, a backend software platform and a Smartphone platform.

As illustrated in FIG. 3, the sensing device software platform (300) comprises a real-time operating system (OS), device drivers required for establishing interconnections and network adaptors and providing support for deployment and execution for multiple concurrent telematics services and applications, standard programming languages and development tools for software development, remote deployment, real-time monitoring and management of deployed software components, support for secure deployment of trusted applications and services and fine grained access controls. In an embodiment, considering these requirements for executing various applications and services, the programming language such as JAVA and OSGI as a service delivery platform is utilized.

FIG. 4 is a software platform architecture diagram (400) illustrating various backend components in the backend software platform. The backend software platform comprises a scalable sensor service module, a scalable storage service module, a scalable analytics services module, web-based portals facilitating connectivity with end-user mobile computing devices that collectively implements real-time analytics on data received from various sensor devices installed in a smart-space environment. RIPSAC acts as a PaaS cloud computing platform that allows quick and easy development, deployment and administration of sensor driven applications. RIPSAC provides sensor device management, data acquisition, data storage and analytics services. These services are made available to application developers in form of application program interfaces (APIs) and software development kits (SDKs). RIPSAC provides a highly scalable platform for sensor integration, sensor data storage, analytics (including real-time and Big Data processing), rich query capabilities (including geo-spatial queries and continuous queries) and visualization.

At the core of RIPSAC is a set of services related to sensor description, discovery, integration, sensor observation and measurement capture, storage and query. RIPSAC provides these services in form of APIs and libraries. App developers can develop, test, deploy and manage applications in RIPSAC. RIPSAC supports multi-tenancy and provides secure sandboxes for testing and deployment of applications by each tenant. End users computing devices are configured to download Apps, subscribe & unsubscribe to them, control their privacy settings, and view usage history and billing information.

Thus, the RIPSAC integrates various services, software, libraries, tools in the single infrastructure platform that can be utilized for development and deployment of various sensor-driven applications. In an embodiment of the disclosure, the RIPSAC enables such integration by utilizing standard information models and access mechanisms such as the Open GeoSpatial Consortium (OGC) standards known as Sensor Web Enablement (SWE) standards. In an embodiment, the RIPSAC sensor services provide access to sensor and sensor observation data using these standards. Further, the RIPSAC platform provides client libraries and web service Application Program Interfaces (APIs) that make it feasible and easy to use the information model and access mechanism. In an embodiment, the RIPSAC platform further enables exchanging sensor related events across different applications and services using a messaging infrastructure that consists of message publish-subscribe mechanisms implementing such exchange of sensor related events.

In an embodiment, integration of any software running on RIPSAC (i.e. applications and services) with Analytics engines is provided by means of analytics engine specific libraries included in the RIPSAC platform. In this embodiment, a networking protocol enabling data connection facilitates connection of these libraries to analytics engines running on analytics servers. The libraries hide all complexities and details of network connectivity between the end points. Moreover, these libraries also provide load balancing services across the various analytics servers. In an embodiment, the RIPSAC database services are accessed using a combination of web service calls, technologies such as SQL, JDBC and JPA, and specific database client libraries etc. The various services bundled through said scalable sensor service module, scalable storage service module, scalable analytics services module and web-based portals are now described by referring to FIG. 4.

In an embodiment, as illustrated in FIG. 4, the presentation services module (401) are catered through portals and user Interfaces. The portal component includes application developer's portal, administrator's portal and an end-user subscriber portal. The application developer's portal is utilized to enable application developer's computing devices to register with the RIPSAC, register the developed applications, create databases, upload and test analytics programs etc. The administrator's portal is used by the RIPSAC administrator computer to manage and monitor the underlying software and hardware infrastructure, monitor, manage and control usage of platform services by tenants.

In an embodiment, the device integration and management services component (413) includes data aggregation and device monitoring and management services for interfacing gateway devices, sensors, mobile devices and their network addresses in RIPSAC. These services provide support for various network protocols for data communication between these devices and RIPSAC. This suite of service enables ability to monitor the health and status of the devices and the ability to deploy software on these devices from RIPSAC. In this embodiment, device specific software modules, known as Device Sensor Adapters are provided for each type of device that are able to access the sensors attached to these devices and process sensor specific commands. Further, device specific software modules, known as Device Management Adapters are developed for each type of device that facilitates a web service interface for the following type of activities such as device health monitoring, device starting, stopping and restarting and device data structure access, read and update. In this embodiment, the Device management Adapters typically runs on the device itself. Alternatively, for some devices, Device management Adapters may run as a separate cloud based web service.

The RIPASAC device management services use Device Management Adapters for each device connected to RIPSAC to manage and monitor devices. Further, software modules called RIPSAC Sensor Integration adapters are used by software running on the devices to invoke the RIPSAC Sensor Services over an internet connection. In addition to use of RIPSAC Sensor Integration Adapters, application software running on devices can also call web service interfaces exposed by RIPSAC applications directly. In such scenario, the RIPSAC Integration Adapters are bypassed in the device, but invoked from the RIPSAC application instead. These devices facilitate sensor data acquisition and integration on the platform using either pull-mode or push-mode.

In one embodiment, in case of a pull-mode sensor data acquisition, the sensor data feed is captured by RIPSAC applications by invoking Device Management Adapters running for the devices whose sensor data is required. In another embodiment, if the sensor data is acquired using push-mode, the sensor data is posted to RIPSAC sensor services by the device software either by invoking RIPSAC Sensor Integration Adapters or by calling the web services exposed by RIPSAC applications. In an embodiment, depending on the application logic and type of sensor, the sensor data acquisition may be continuous (i.e. periodic), or event driven, or on demand initiated by some user action. The RIPSAC platform can support time series sensor data in any granularity.

In an embodiment, the Messaging & Event Distribution Services (411) provides an infrastructure for passing of messages and events across RIPSAC services and applications. Further, the Data Storage & Query Services (409) enables large scale, distributed sensor data storage and query facility, including support for geo-spatial queries. These services enable the capability of continuous query processing.

In an embodiment, the analytics services component (407) consists of several libraries and servers comprising machine learning packages, statistical processing packages, rule engines, complex event and stream processing, knowledge driven processing that are configured to perform real-time analytics on the stored sensor data. The Application services component (403) incorporates application components, core sensor services, and user interface & visualization services. The core sensor services enable sensor and sensor observations description services, sensor discovery, feature description and phenomena, inserting & querying observations etc. In this embodiment, in order to insert observations for a given Sensor Id, observation in terms of <Key, Value> pairs, geo-location coordinates of the observation and the time of observation is specified and then the observation is inserted using RIPSAC services. Similarly, observations are queried using one or more parameters including Sensor ID, Phenomenon, Geo-location parameters (points, boundaries etc.), and time parameters. The Observations are used as is or it is passed on to analytics programs and then the output of analytics programs is used for observations. The user interface & visualization services component incorporates libraries and tools for creating rich visualizations and reports from the sensor data.

In an embodiment, the application components include producer applications component, consumer applications component and producer cum consumer applications component. The producer applications component is configured to publish sensor data to the RIPSAC platform. The consumer applications component is adapted to query and use sensor data from the RIPSAC platform. The producer cum consumer applications component is configured to simultaneously act as both producer applications component and consumer applications components.

In an embodiment, the application support services component (405) includes integration & orchestration services, planners, platform APIs & SDKs that collectively provide support for various RIPSAC service integration and orchestration thereof. The Service Orchestration allows creation of composite applications or composite services. Service Orchestration is itself a platform service that is available to application developers for the purpose of creating composite applications. Access to service orchestration services, like any other RIPSAC services, is controlled using policy driven access controls. The Service Orchestration services in the RIPSAC are implemented using a standard web service orchestration engine. These Services will allow application developers to specify the orchestration logic using standard web service orchestration languages such as Business Process Execution Language (BPEL). RIPSAC Orchestration services make it simpler to use orchestration services by hiding the details of orchestration engines and engine specific complexities. The RIPSAC platform enables these SDKs and APIs to provide support for third party application developers and also provides them access to developer sandboxes and training data. The application developers can test and verify the various applications built on the software platform enabling real-time analytics by utilizing the test data, development sandboxes and device simulators provided by the backend software platform. APIs and SDKs are software development tools that acts as Web Services and language specific bindings to various RIPSAC services.

In an embodiment, the RIPSAC backend platform further facilitates Software infrastructure that comprise application servers, relational databases and document databases. The application servers act as Containers/Virtual Machines/hosts on which user applications are executed. The relational databases and document databases services enable storage of data and documents in the RIPSAC backend platform. Additionally, the RIPSAC facilitate data center infrastructure services that include Compute, Network & Disk Storage Services, File Services and Firewall Services. The Compute, Network & Disk Storage Service consists of servers, disks and network resources that act as a virtual hardware infrastructure on which RIPSAC components finally run. File storage services are provided to servers using File Services. The Firewall Services are adapted to create secure zones based on policies to separate different tenants from each other.

In one embodiment of the disclosure, in order to enable flexible, extensible and interoperable platform that can accommodate and interoperate with virtually any sensor type and to allow easy addition of new applications and services, the platform adopts suitable database schemas and message encodings. The database schemas are designed in such a way so that virtually any sensor measurements and observations made in smart-space environment and can be stored for both immediate and historical use. Similarly, suitable XML based encodings and schemas can be used in messages transferred from the sensing device to the backend platform. Apart from proprietary protocols, both the telematics device as well as backend platform will support standard web services and http for accessing sensor observations.

In one embodiment, the RIPSAC platform incorporates Privacy preservation important feature in the software stack of the backend platform. Various sensor-based applications and services require various levels of privacy preservation and the proposed disclosure enables tailored levels of privacy protection for each application or service. Privacy preservation is achieved via the following four sub-components:

- Policy driven and adaptive access control software layer is configured for allowing fine grained control over who can access various sensors, sensor observation values and sensor database records and fields.
- Robust privacy preserving algorithms configured for anonymizing, diversifying, perturbing and randomizing privacy sensitive data.
- Data transformation algorithms configured for transforming private data to forms suitable for publishing for public consumption and vice versa.
- Use of Trusted Computing concepts and Trusted Platform Modules for secure and trusted storage of keys and algorithms for privacy preservation and data transformations as described above.

In an embodiment, the Smartphone software platform includes a software development kit (SDK) compatible to the Smartphone and an app-store model. The platform (100), if implemented as a Smartphone app is configured to be made compatible with various Smartphone devices in the market built on several operating systems (OS) or simple Java phones supporting J2ME, CLDC, MIDP and Midlets. The hardware platform illustrated in FIG. 2 in combination with the software platforms such as the sensing device software platform, the backend software platform and the Smartphone platform by virtue of single integrated cloud-computing platform enable the subscribers and other authorized third parties to perform various tasks based on the data analytics results that may be implemented in the cloud or in the vicinity of monitored and analyzed smart-space environment.

Figure 5:
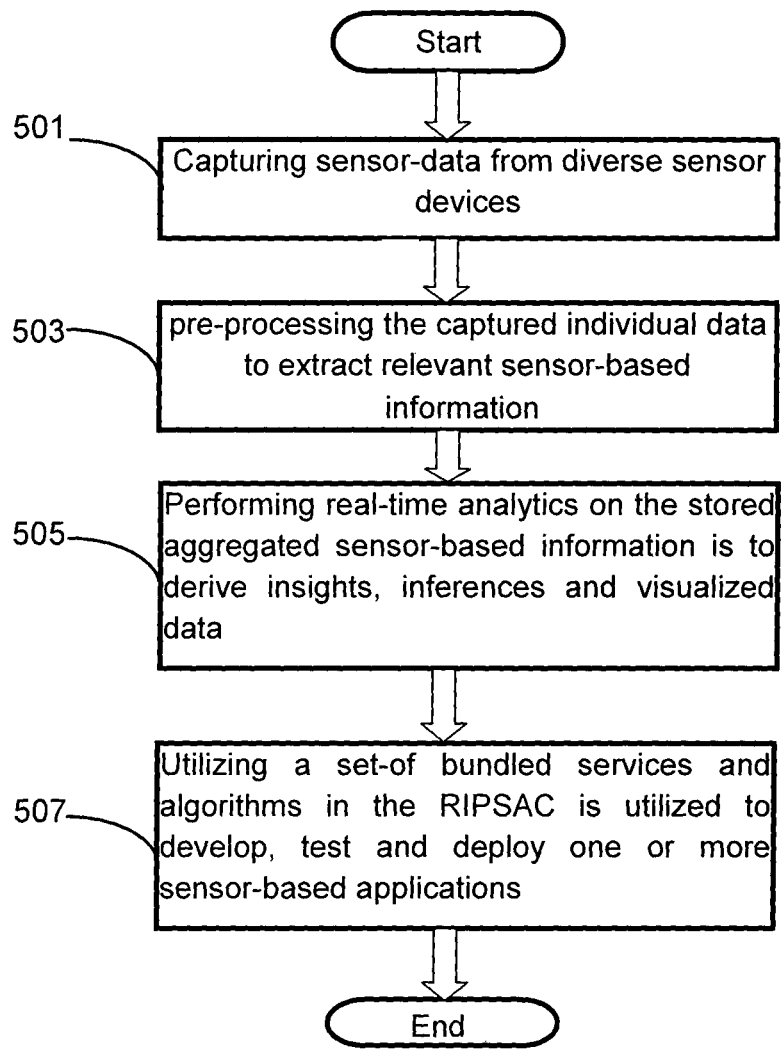
FIG. 5 is a flow diagram illustrating steps designed to enable the RIPSAC platform to perform the task of real-time analytics of any smart-space environment according to an exemplary embodiment.

Referring to FIG. 5 is a flow diagram illustrating steps designed to enable the RIPSAC platform to perform the task of real-time analytics of any smart-space environment according to an exemplary embodiment.

At step 501, sensor-based data in assorted formats is captured from one or more sensors deployed in the smart-space environment.

At step 503, the sensor-based data is pre-processed the captured data to extract relevant sensor-based information and enable storage thereof in a database.

At step 505, real-time analytics on the stored sensor-based information is performed to derive insights, inferences and visualized data therefrom.

At step 507, a set-of bundled services and algorithms in the RIPSAC is utilized to develop, test and deploy one or more sensor-based applications based on the results of real-time analytics.

The preceding description has been presented with reference to various embodiments of the disclosure. Persons skilled in the art and technology to which this disclosure pertains will appreciate that alterations and changes in the described structures and methods of operation can be practiced without meaningfully departing from the principle, spirit and scope of this disclosure.

Exemplary embodiments discussed above may provide certain advantages. Though not required to practice aspects of the disclosure, these advantages may include those provided by the following features.

Some embodiments of the present disclosure enable a platform-as-a-service cloud computing platform that allows quick and easy development, deployment and administration of sensor driven applications.

Some embodiments of the present disclosure provide an integrated platform for sensor data capture, storage, analytics, and visualization etc.

Some embodiments of the present disclosure enable easy development and deployment of applications developed by many different third party developers using a set of services are made available in form of Application Programming Interfaces (APIs) and Software Development Kits (SDKs).

Some embodiments of the present disclosure enable multiple sensor data providers, multiple application developers and application end users to connect with the platform in a secure and mutually isolated way for accessing various services and application facilitated by the platform.

Some embodiments of the present disclosure enable sensor data to be shared across applications and users by facilitating policy driven data privacy and policy driven data on the platform.

Some embodiments of the present disclosure enable the platform to interface with any kind of sensor, independent of the type of the sensor and the sensor data observation.

Some embodiments of the present disclosure provide scalable sensor data storage for a wide variety of sensors and sensor observations and provides scalable analytics services.

The invention claimed is:

1. An intelligent transportation system comprising:
   an unified infrastructure platform comprising a plurality of hardware & software components, a plurality of infrastructure services, Application Program Interfaces (APIs), Software Development Kits (SDKs), wherein the plurality of infrastructure services are capable of executing algorithms, functions and calls required for developing a suite of sensor driven applications;
   a plurality of sensor devices intermittently connected with the infrastructure platform by means of communication networks, wherein the plurality of sensor devices are capable of transmitting sensor data feeds to the infrastructure platform where the suite of sensor driven applications are to be developed corresponding to the sensor data feeds; and
   a vehicle telemetry application development platform electronically coupled with the infrastructure platform for facilitating the development of the suite of sensor driven applications by:
      enabling a plurality of application developers to select services and algorithms, from the plurality of infrastructure services, relevant in context with domain of the suite of sensor driven applications;
      enabling the plurality of application developers to develop the suite of sensor driven applications and algorithms thereof using the services selected from the plurality of infrastructure services;
      enabling real time analysis of sensor data based on the sensor data feeds captured from the plurality of sensor devices by invoking device management adapters for the plurality of sensor devices;
      storing said sensor data in a plurality of assorted formats, said sensor data captured from the plurality of sensor devices in a database connected to the unified infrastructure platform, wherein the sensor data captured is transformed to enable the plurality of application developers to develop and test the suite of sensor driven applications such that privacy related to the sensor data captured is protected;
      enabling exchange of a plurality of sensor related events across the suite of sensor driven applications and the plurality of infrastructure services through a messaging infrastructure;
      performing a scalable real-time data analytics on relevant sensor based information using at least one of machine learning packages, statistical processing packages, rule engines, complex event and stream processing, and knowledge driven processing to derive insights, inferences and visualized data of the relevant sensor based information;
      facilitating instant development, deployment, and management of the suite of sensor driven applications, wherein the suite of sensor driven applications facilitates vehicle anomaly detection and prognosis and wherein the vehicle anomaly detection and the prognosis enable safety and security of a vehicle; and
      integrating a plurality of software components, libraries, said infrastructure services, one or more software development tools to said infrastructure platform, wherein the intelligent transportation platform further facilitates plugging-in the suite of sensor driven applications on the infrastructure services for facilitating application development and thereby enabling data reusability.

2. The system of claim 1, wherein the plurality of hardware components comprise computer machines, virtual machines, servers, disks, network resources or combinations thereof.

3. The system of claim 1, wherein the plurality of hardware components are configured by the plurality of software components embedded in the infrastructure platform.

4. The system of claim 1, wherein the plurality of infrastructure services comprises an edge analytics service, a backend storage service, a backend analytics service, a reporting service or combinations thereof.

5. The system of claim 1, wherein the edge analytics service is adapted to perform analytics on the sensor data feeds by means of preprocessing and feature extraction that leads to data reduction and allowing for storage of features extracted from the sensor data feeds.

6. The system of claim 5, wherein the backend storage service is configured to enable storage and retrieval of the sensor data by means of a Sensor Observation Service.

7. The system of claim 5, wherein the backend analytics service is configured for performing analytics on a back end subsystem enabling, classification and clustering of the stored sensor data.

8. The system of claim 5, wherein the reporting service is adapted to provide audio/visual alerts to a plurality of end-user subscribers based on results of analytics performed on the stored sensor data.

9. The system of claim 1, wherein the plurality of sensor devices are adapted to sense least one of temperature, pressure, location, motion, gyroscope, acceleration, deceleration, cardiac data and a combination thereof.

10. The system of claim 1, wherein the vehicle telemetry application development platform enables the plurality of application developers to invoke the services and computing algorithms therefrom by means of the APIs and the SDKs to develop the suite of sensor driven applications, wherein the suite of sensor driven applications further comprises diverse vehicle telemetry applications.

11. The system of claim 6, wherein the vehicle telemetry applications comprises at least one of pot-hole detection, rough-vehicle detection, cardiac-activity monitoring, in-car diagnostic and prognosis thereof, remote-photography, remote tourist guidance, driver-drowsiness identification, remote sleep-detection, remote damage assessment, managing unmanned railway-check posts, remote vehicle communication and a combination thereof.

12. The system of claim 1, wherein the plurality of sensor devices comprise at least one of soft sensors, physical sensors, virtual sensors and a combination thereof.

13. A method for providing an intelligent transportation platform, the method comprising:
   integrating a plurality of infrastructure services on the intelligent transportation platform, wherein the plurality of infrastructure services are capable of executing algorithms, functions and calls to develop a suite of sensor driven applications corresponding to sensor data feeds received from a plurality of sensor devices;
   electronically coupling a vehicle telemetry application development platform with an infrastructure platform for facilitating the development of the suite of sensor driven applications by:
      enabling a plurality of application developers to select services and algorithms, from the plurality of infrastructure services, relevant in context with domain of the suite of sensor driven applications to be developed thereof;
      configuring the intelligent transportation platform to enable the plurality of application developers to develop the suite of sensor driven applications and algorithms thereof using the services selected from the plurality of infrastructure services;
      enabling real time analysis of sensor data based on the sensor data feeds captured from the plurality of sensor devices by invoking device management adapters for the plurality of sensor devices;
      storing said sensor data in a plurality of assorted formats, said sensor data captured from the plurality of sensor devices in a database connected to the unified infrastructure platform, wherein the sensor data captured is transformed to enable the plurality of application developers to develop and test the suite of sensor driven applications such that privacy related to the sensor data captured is protected;
      enabling exchange of a plurality of sensor related events across the suite of sensor driven applications and the plurality of infrastructure services through a messaging infrastructure;
      performing scalable real-time data analytics on relevant sensor based information using at least one of machine learning packages, statistical processing packages, rule engines, complex event and stream processing, and knowledge driven processing to derive insights, inferences and visualized data of the relevant sensor based information;
      facilitating instant development, deployment, and management of the suite of sensor driven applications, wherein the suite of sensor driven applications facilitates vehicle anomaly detection and prognosis and wherein the vehicle anomaly detection and the prognosis enable safety and security of a vehicle; and
      integrating a plurality of software components, libraries, said infrastructure services, one or more software development tools to said infrastructure platform, wherein the intelligent transportation platform further facilitates plugging-in the suite of sensor driven applications on the infrastructure services for facilitating application development and thereby enabling data reusability.

14. The method of claim 13, wherein the plurality of sensor devices are adapted to sense at least one of temperature, pressure, location, motion, gyroscope, acceleration, deceleration, cardiac data and a combination thereof.

15. The method of claim 13, wherein the plurality of infrastructure services comprises an edge analytics service adapted to perform analytics on the sensor data feeds by means of preprocessing and feature extraction that leads to data reduction and allowing for storage of features extracted from the sensor data feeds.

16. The method of claim 13, wherein the plurality of infrastructure services comprises a backend storage service configured to enable storage and retrieval of the sensor data by means of a Sensor Observation Service.

17. The method of claim 13, wherein the plurality of infrastructure services comprises a backend analytics service configured for performing analytics on a back-end subsystem enabling classification and clustering of the stored sensor data.

18. The method of claim 13, wherein the plurality of infrastructure services comprises a reporting service adapted to provide alerts to a plurality of end-user subscribers based on results of analytics performed on the sensor data.

19. The method of claim 13, wherein the sensor data feeds are captured through at least one of on-board/off-board vehicular sensors, smartphones, proximity sensor gateway devices and combinations thereof.

20. The method of claim 13, wherein the plurality of sensor devices comprise at least one of physical sensors, virtual sensors, soft sensors and a combination thereof.

21. The method of claim 13, wherein the algorithms, functions and calls are executed depending on the services selected and the context of the plurality of sensor driven applications to be developed, test and deployed.

22. The method of claim 13, wherein the intelligent transportation platform is further configured for providing test data to the plurality of application developers for testing the suite of sensor driven applications.

* * * * *